US010706716B2

United States Patent
Drake

(10) Patent No.: US 10,706,716 B2
(45) Date of Patent: Jul. 7, 2020

(54) VEHICLE INTERFACE SYSTEM

(71) Applicant: K-9 ICE, LLC, Davidson, NC (US)

(72) Inventor: Manning Drake, Davidson, NC (US)

(73) Assignee: K-9 ICE, LLC, Davidson, NC (US)

( * ) Notice: Subject to any disclaimer, the term of this patent is extended or adjusted under 35 U.S.C. 154(b) by 0 days.

(21) Appl. No.: 15/474,662

(22) Filed: Mar. 30, 2017

(65) Prior Publication Data
US 2017/0287322 A1 Oct. 5, 2017

Related U.S. Application Data

(60) Provisional application No. 62/315,420, filed on Mar. 30, 2016.

(51) Int. Cl.
| G08C 17/02 | (2006.01) |
| B60H 1/00 | (2006.01) |
| E05F 15/77 | (2015.01) |
| G07C 5/00 | (2006.01) |
| G07C 5/12 | (2006.01) |
| E05F 15/71 | (2015.01) |
| G07C 5/08 | (2006.01) |
| H04W 88/02 | (2009.01) |

(52) U.S. Cl.
CPC ............ *G08C 17/02* (2013.01); *E05F 15/71* (2015.01); *E05F 15/77* (2015.01); *G07C 5/008* (2013.01); *G07C 5/0816* (2013.01); *G07C 5/12* (2013.01); *B60H 1/00657* (2013.01); *E05Y 2400/44* (2013.01); *E05Y 2400/52* (2013.01); *E05Y 2400/818* (2013.01); *E05Y 2900/55* (2013.01); *G08C 2201/50* (2013.01); *G08C 2201/93* (2013.01); *H04W 88/02* (2013.01)

(58) Field of Classification Search
CPC .......... G08C 17/02; G08C 5/12; G08C 5/008; G08C 5/0816; E05F 15/77; E05F 15/71; E05Y 2400/818; E05Y 2400/52; E05Y 2900/55; H04W 88/02
See application file for complete search history.

(56) References Cited

U.S. PATENT DOCUMENTS

| 2007/0050191 A1* | 3/2007 | Weider | G06F 17/30864 704/275 |
| 2010/0075655 A1* | 3/2010 | Howarter | B60R 25/2009 455/420 |
| 2010/0075656 A1* | 3/2010 | Howarter | B60R 25/2009 455/420 |

(Continued)

Primary Examiner — Mussa A Shaawat
(74) Attorney, Agent, or Firm — Oliff PLC; R. Brian Drozd

(57) ABSTRACT

A vehicle interface system for a vehicle, the vehicle interface system comprising: a vehicle computing system comprising a processor that is configured to collect cabin conditions including cabin temperature of the vehicle; an on board diagnostic (OBD) device attached to the vehicle and configured to communicate data collected from the vehicle computing system to a communication service over a network; and a mobile device comprising a processor and that is connected remote from the vehicle over the network, the mobile device being configured to connect to the network to obtain the data from the OBD device and to receive a command from a user to control one or more components of the vehicle to control the internal temperature of the cabin of the vehicle.

15 Claims, 18 Drawing Sheets

(56) References Cited

U.S. PATENT DOCUMENTS

| | | | |
|---|---|---|---|
| 2012/0028680 A1* | 2/2012 | Breed | B60C 11/24 455/556.1 |
| 2014/0189814 A1* | 7/2014 | Marten | G07C 5/008 726/4 |
| 2014/0240089 A1* | 8/2014 | Chang | G07C 9/00111 340/5.61 |
| 2014/0306838 A1* | 10/2014 | Beumler | B60N 2/28 340/988 |
| 2015/0234531 A1* | 8/2015 | Newman | G06F 3/0416 345/174 |
| 2016/0090055 A1* | 3/2016 | Breed | B60R 16/037 701/2 |
| 2017/0028811 A1* | 2/2017 | Jayasundera | B60H 1/00742 |
| 2017/0174156 A1* | 6/2017 | Zulkowski | B60H 1/00978 |

* cited by examiner

FIGURE 3

VEHICLE INTERFACE SYSTEM

BACKGROUND

Currently, children and pets are being left in vehicles during summer or winter months, which puts the children or pets at risk of physical health or even worse, death by overheating, freezing, exhaustion, etc. There is no current way to remedy this problem, especially for law enforcement officers who may have patrol dogs in their police vehicles when the officer is unexpectedly away from their vehicle, such as an unexpected foot chase of a criminal.

SUMMARY OF INVENTION

Embodiments of the present disclosure fully protects a user by both alerting them to conditions within the vehicle which require further review and monitoring, or actions such as ones that bring the cabin temperature (or other conditions) into the range of safety or alert backup contacts to perform actions for the vehicle and those (e.g., humans, pets, etc.) inside.

The present device includes both alerts and notification, and automatic action in response to predefined conditions. That is not to say, however, that without automatic action the present device is not functioning, simply that there are only some of the intended protection measures and avenues of action available to that particular user. It is possible that, with the combination of ages of different vehicles involved, types of mobile phone devices and on-board diagnostics (OBD) connection devices involved, that the combinations result in different levels of functionality available to them from the system disclosed herein.

In one embodiment, provided is a vehicle interface system for a vehicle, the vehicle interface system comprising: a vehicle computing system comprising a processor that is configured to collect cabin conditions including cabin temperature of the vehicle; an on board diagnostic (OBD) device attached to the vehicle and configured to communicate data collected from the vehicle computing system to a communication service over a network; and a mobile device comprising a processor and that is connected remote from the vehicle over the network, the mobile device being configured to connect to the network to obtain the data from the OBD device and to receive a command from a user to control one or more components of the vehicle to control the internal temperature of the cabin of the vehicle In one embodiment, provided is a method of controlling an internal cabin temperature of a vehicle, the method comprising: obtaining data, via a vehicle computing system comprising a processor, about an internal temperature of a cabin of a vehicle; sending the obtained data, to a vehicle system device comprising a controller, the vehicle system device being attached to the vehicle; sending, from the vehicle system device over a network, the obtained data to a mobile device comprising a processor, wherein the mobile device is connected remotely from the vehicle over the network; receiving, at the vehicle system device from the mobile device over the network, a command from a user to control one or more components of the vehicle to control the internal temperature of the cabin of the vehicle; and transmitting, from the vehicle system device to the vehicle computing system, the command so that the vehicle computing system controls one or more components of the vehicle as instructed by the command.

In another embodiment, a vehicle is provided that includes a vehicle interface system. The vehicle interface system includes a vehicle computing system comprising a processor that is configured to collect cabin conditions including cabin temperature of the vehicle; and an on board diagnostic (OBD) device attached to the vehicle and configured to communicate data collected from the vehicle computing system to a communication service over a network. The on board diagnostic (OBD) device is configured to communicated with a mobile device over the network, to send the data from the OBD device and to receive a command from a user via the mobile device to control one or more components of the vehicle to control the internal temperature of the cabin of the vehicle.

Note that the various features of the present invention described above may be practiced alone or in combination. These and other features of the present invention will be described in more detail below in the detailed description of the invention and in conjunction with the following figures.

BRIEF DESCRIPTION OF DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein:

FIG. 3 is a graphical user interface of a personal computer for web registration of remotely-controlled vehicle operations according to one embodiment.

DETAILED DESCRIPTION

Figure 1:
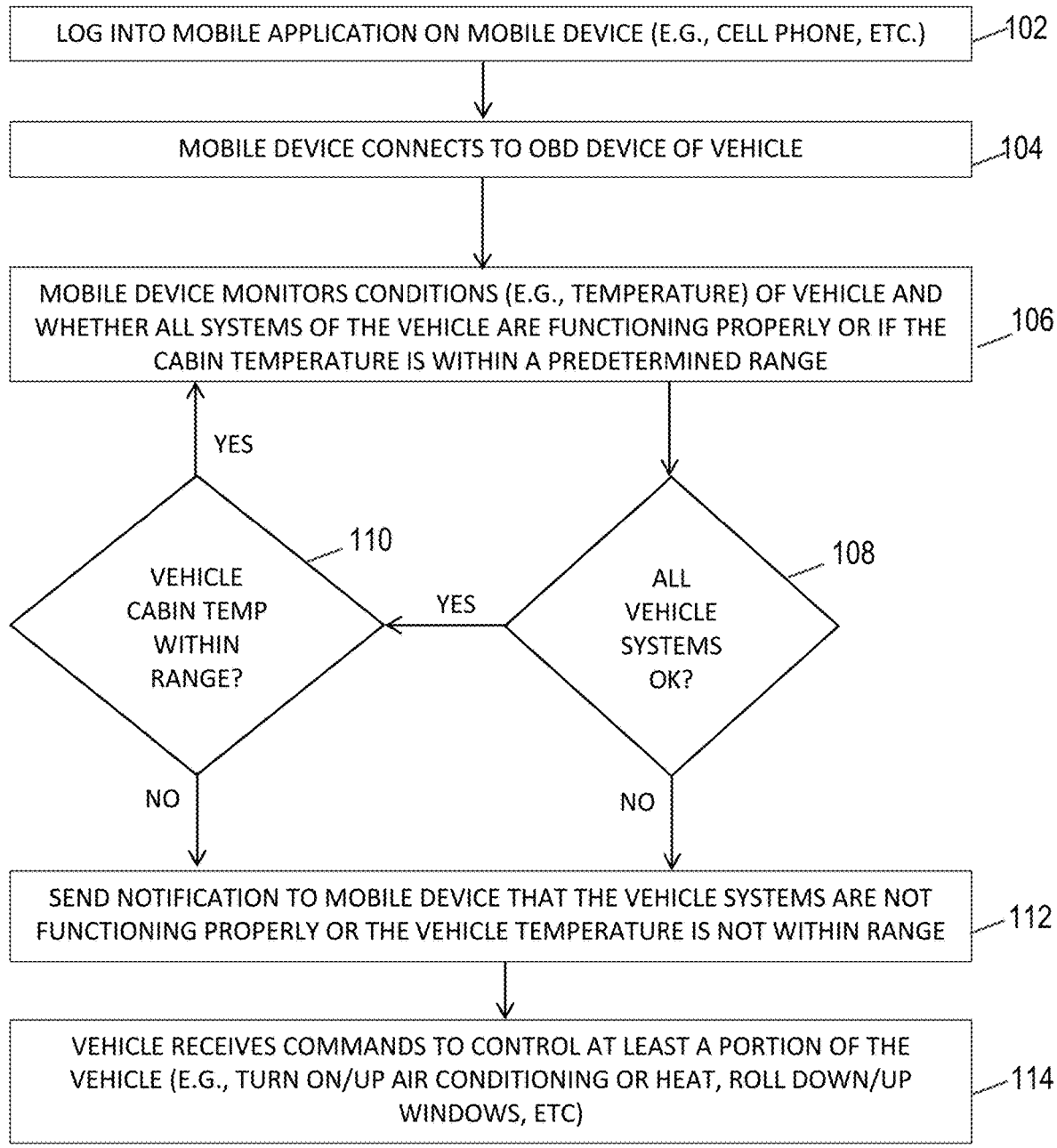
FIG. 1 illustrates a flow chart of the remotely-controlled vehicle operations according to some embodiments.

Embodiments of the present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language, mobile device programming languages, or similar programming languages. The program code may execute entirely on the user's mobile computing device (or computer), partly on the user's computing device (or computer), as a stand-alone software package, partly on the user's computing device (or computer) and partly on a vehicle's computing device or entirely on the vehicle's computing device or on a remote computer/server. In one scenario, the vehicle's computing device may be connected to the user's mobile computing device or computer through any type of network, including a local area network (LAN) or a wide area network (WAN), short range communications connection/network, or the connection may be made to an external computer (for example, through the Internet using an Internet Service Provider).

The present application refers to software and hardware to perform a specific set of tasks and functions. The tools involved may include standard technology platforms such as Microsoft IIS and SQL Server and ASP.NET code within websites, languages and formats used for communication through application protocol interfaces (APIs), Bluetooth, Wi-Fi and similar communication methods. The present system also utilizes device hardware including OBD-II devices, fuse and jumper elements. Various tools and technologies used in the creation of the hardware and software remain the rights of the original copyright holders. Any copyright claim is limited to the code and software developed within these tools and the process and algorithms and functionality intents involved in the present system.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computing device/computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device/computer, other programmable data processing apparatus, or other devices to cause a series of operational steps to be performed on the computing device/computer, other programmable apparatus or other devices to produce a computer implemented process such that the instructions which execute on the computing device/ computer or other programmable apparatus provide processes for implementing the functions/acts specified in the flowchart and/or block diagram block or blocks.

In accordance with an aspect of the invention, solutions for name resolution are disclosed and will now be generally introduced. Embodiments of the present invention relates to systems and methods for a vehicle interface system, and more particularly a remotely-monitored and/or controlled system and method for controlling systems of a vehicle for controlling conditions within the cabin of the vehicle. Such avatars are useful in conjunction with Massively Multiplayer Online Games (MMOGs), virtual social worlds and online web communities, generically referred to as "virtual environments". All virtual environments may be collectively referred to as the "virtual universe". A persistent avatar may be a character, non-player character, quasi-player character, agent, personal assistant, personality, guide, representation, educator or any additional virtual entity that requires persistence between virtual environments. In a society of ever increasing reliance and blending between real life and our virtual lives, the ability to migrate seamlessly between virtual environments with a substantially constant set of attributes is highly desirable and advantageous To facilitate discussion, embodiments of the present application are discussed below using FIGS. 1-20.

Figure 2:
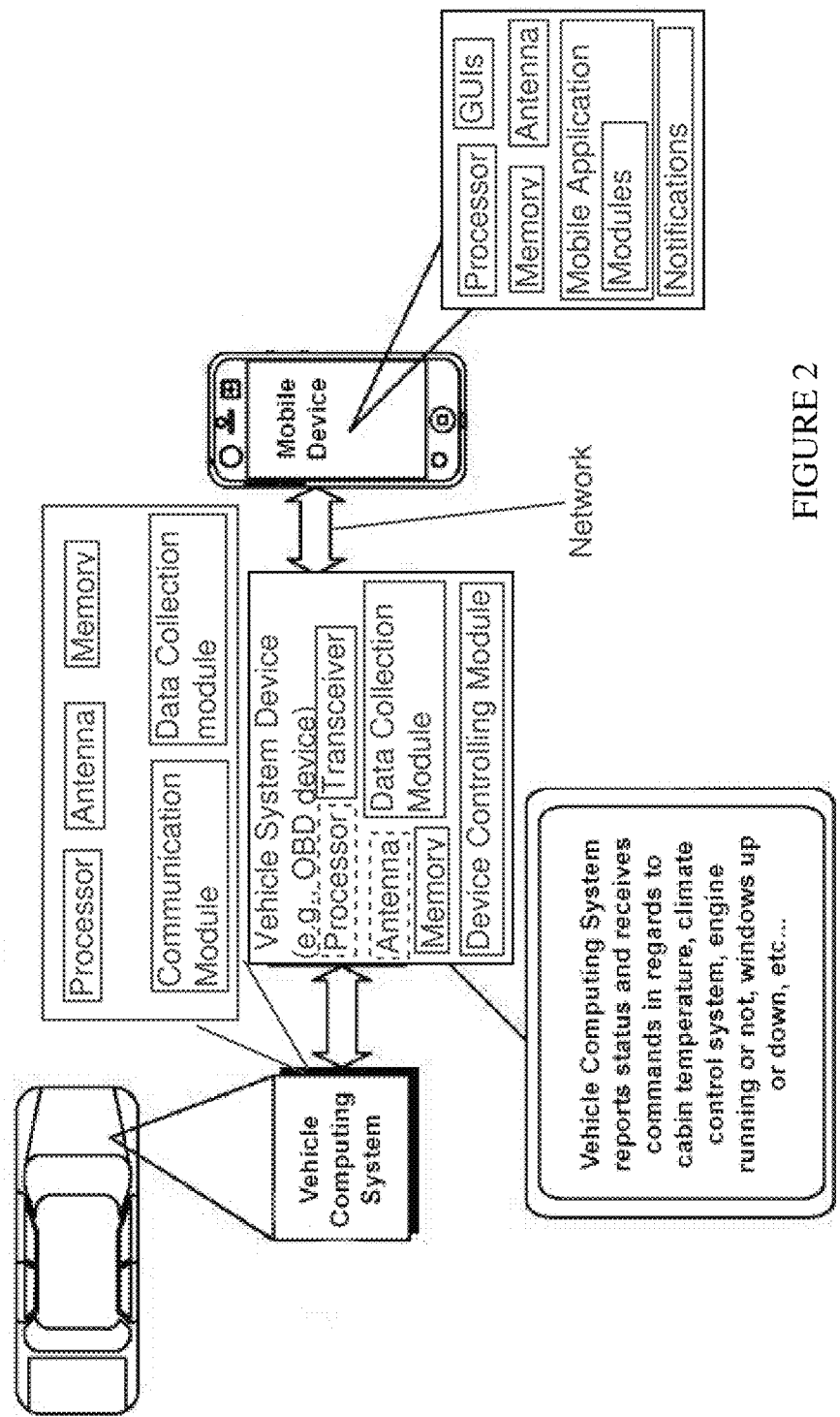
FIG. 2 illustrates a system of the remotely-controlled vehicle operations according to one embodiment.

FIG. 2 shows a schematic block diagram illustrating a vehicle interface system in accordance with an embodiment of the present invention. A network, such as a Wide Area Network (WAN), provides a medium for components to communicate and have access to one another. In some embodiments the WAN may be the Internet, however any WAN may be used as is known by those skilled in the art. Network connections may be made through an Ethernet cable, although other network wiring technologies, such as high speed optical cable, may also be used. Additionally or alternatively, the network connection may be a wireless network may be used to couple networked devices or networks.

It should be noted that the methods discussed herein may be embodied in or performed by the vehicle system device and/or on the user's mobile computing device, which are discussed below.

As shown in FIG. 2, the present system may include a vehicle computing system. The vehicle computing system may include a processor, antenna, memory, a communication module and a data collection module.

The processor of the vehicle computing system is configured to execute commands and instructions received in memory of the vehicle computing system. The antenna of the vehicle computing system may be configured to communicate over a cellular network and/or a short range communications network. The communication module of the vehicle computing system is configured to communicate data from the vehicles components (e.g., engine, AC system, heating system, windows, etc.) and receive data from a vehicles system device (discussed below). The data collection module of the vehicle computing system is configured to collect data as instructed by the vehicle system device. The data collection module is configured to cooperate with the communication module of the vehicle computing system so that the vehicle computing system communicates data to the vehicle system device that is requested by the vehicle system device.

The present system may also have at least two components: (1) a vehicle system device (e.g., an on board diagnostic (OBD) device) which may be installed in a vehicle computing system on a vehicle and (2) a mobile device with a mobile software application that communicates with the OBD device directly (via short range communications) or over a wide area network. These components will be discussed below.

It should be noted that the vehicle system device and the vehicle computing system may be a single integrated system such that the vehicle system device is a part of the vehicle computing system.

It should also be noted that the present disclosure may refer to the vehicle's system device as the OBD device, but it should be understood that the present invention is not limited to the vehicle's system device being the OBD device. Indeed, the vehicle's system device can be any device which can receive commands/instructions from the mobile device and cause the commands/instructions be executed by a component of the vehicle so that one or more components of the vehicle are controlled remotely by a user of the user's mobile computing device.

The OBD device or the vehicle's system device may be any device that connects via hardware to the vehicle and communicates data from devices of the vehicle, including a temperature sensor, window/sunroof controls, air conditioning system, heating system, engine operations, and the like. The OBD device or vehicle's system device also communicates with the mobile device to provide the mobile device with data received by the OBD device/vehicle's system device and allows the mobile device to control various operations of the vehicle. For example, the OBD device/ vehicle's system device may continuously receive data from a temperature sensor in the vehicle to determine the internal temperature of the cabin of the vehicle (and other data including whether the engine has stopped running) and transmit this data to the mobile device so that the mobile device has information of the current and future conditions of the cabin of the vehicle. The mobile device then may send commands to the OBD device/vehicle's system device to control the air conditioning system or heating system of the vehicle to turn one of these systems on or off, control the windows/sunroof, turn the engine on or off, etc. The OBD device/vehicle's system device then sends these commands to the appropriate device in the vehicle to operate the devices as commanded by the mobile device.

The OBD device (vehicle's system device) and the mobile computing device (also referred to herein a the "mobile device") communicate with each other over a network. This network may be over a cellular system or wide area network, or may be via a short range communications system (such as Bluetooth, RFID, or any other range within a few hundred feet).

The vehicle's system device may include a processor and antenna separate from the processor and antenna of the vehicle computing system or the vehicle's system device may use the processor and antenna of the vehicle's computing system.

The vehicle's system device may also include memory to store data (temporarily or permanently), a transceiver to communicate data/instructions/commands to/from the vehicle's computing system and also communicate data/instructions/commands to/from the mobile computing device.

The vehicle's system device may also include a data collection module which is configured to collect data from the vehicle computing system based on data or instructions received from the mobile device over the network. For example, these instructions may instruct the vehicle computing system to gather information about components of the vehicle.

The vehicle's system device may also include a device controlling module which is configured to generate or forward instructions to the vehicle computing system for controlling one or more components (which may be the same components where data is collected or other components) based on data or instructions received from the mobile device over the network.

In one embodiment, the vehicle's system device is an OBD device that may be an on-board diagnostic system commonly known as an "OBD-II" device. The vehicle's system device may have or may communicate with a computer processor and memory to perform instructions/commands provided by the mobile device. For example, the vehicle's system device may use the vehicles computer to execute one or more functions discussed herein. The vehicle's system device is connected to an antenna of the vehicle and/or may have its own antenna to communicate over the above-discussed network (e.g., cellular, short range, etc.). In this regard, the vehicle's system device is configured to connect with the mobile device over the network.

In one embodiment, the mobile device may be a phone configured for communication over a cellular network and/or over short range communications, whereby the phone can download an application that has instructions which, when executed, causes the mobile device to perform the functions described herein for the mobile device and displays the mobile application interface shown herein. The mobile device includes a processor and a memory. The memory may be non-transitory and may be configured to store instructions for performing the functions discussed herein for the mobile device. The mobile device also has one or more antennas which communicate over a network (e.g., cellular network, short range communications network, etc.) to connect to the vehicle. The mobile device also has a processor and memory.

The mobile device includes a mobile application which has modules (i.e., instructions) for executing the steps discussed herein for the mobile device to execute. For example, the mobile application may include a module for remotely monitoring the vehicles components and also a module to interface with the vehicles system device to control the vehicle's components via the vehicle computing system. The mobile application allows the user to initiate an electronic communication with the mobile device using an application via the computer system. The mobile application may be accessed or activated whenever the user desires to control the vehicle's components and may call other modules such as the GUIs as described below. The mobile application also allows input of various preferences and settings. The mobile application may communicate with any module on the vehicle's computing system and the vehicles system device.

FIG. 1 illustrates a flow chart of the remotely-controlled vehicle operations according to some embodiments. As shown in step 102 of FIG. 1, a user of the mobile device logs into the mobile application over the network. The mobile application connects to the vehicle systems, such as via the OBD device, under step 104, via either the network or a short range communications system.

Using the vehicle system device (e.g., the OBD device) over the network, the mobile application then monitors conditions of the vehicle, such as the vehicle cabin temperature, operations of the vehicle (e.g., engine failure, AC failure, etc.), under step 106. For example, the vehicle system device (e.g., OBD device) may continuously monitor the vehicle cabin temperature to determine if the vehicle cabin temperature is within a predetermined range set by the user, under step 110. The user may set the predetermined temperature range during the setup of the mobile application. If the vehicle system device (e.g., OBD device) determines that the temperature is not within the user's predetermined range, then the vehicle system device (e.g., OBD device) sends a notification to the mobile application on the mobile device over the network (or via short range communications) and/or can perform automatic functions (such as increasing the AC, increasing the heat, etc.), under step 112.

Also, the vehicle system device (e.g., OBD device) then continuously monitors the vehicle operations are to determine if any of the vehicle systems (e.g., engine, air conditioning, etc.) are non-operational, under step 108. For example, if the AC unit of the vehicle is malfunctioning, the vehicle system device (e.g., OBD device) will identify that issue. In the event that any of the vehicle systems are non-operational, the vehicle system device (e.g., OBD device) sends a notification to the mobile application on the mobile device and/or can perform automatic functions (such as rolling down the windows, executing auxiliary systems, etc.), under step 112.

These functions can be realized by sending a command to the OBD device from the mobile device which over a network (or short range communication) then controls operations of the vehicle based on the command received from the mobile application, under step 114.

Other operations of the system are explained in more depth in FIGS. 3-20, discussed below.

In one specific embodiment, an OBD-II device plugs into any vehicle's diagnostic port (manufactured after 1996), where one is able to provide full control of the vehicle's cabin climate. This uses the vehicle's OBD codes to communicate the status of the vehicle and a thermostat built into the OBD-II device to communicate the cabin temperature to the smartphone app. Commands are delivered back to the vehicle via the OBD-II device or through a series of relays that plug into the vehicle's electronics system.

The latest concept functions as part of the vehicle's built-in onboard computer system as an on-screen app. (OnStar and MyLink are examples of these services in vehicles.) The built-in in-vehicle app communicates directly with an app on the consumer's smartphone and allows display of the vehicle's current status and climate conditions. The mobile application allows the user to control the temperature, shut off the engine, control the windows, and adjust various other conditions in the vehicle's cabin. Notifications are sent to the application when certain pre-set conditions are met (high temperature, low temperature, low fuel level, engine failure, etc. . . . ).

The following are components of the present system according to some embodiments: the user, vehicle, mobile device, vehicle communication device (In-Dash or OBD-II Device(s)), a communication service (website service or licensed partner/affiliate service), and the mobile application. Each of these components are discussed below.

User

First, for the user, the system may be utilized by any person or machine (i.e., the user) who completes the steps of:

1—Purchasing a license or who has one purchased for them as part of an enabled vehicle purchase package or similar vendor or resale program. The license details are subject to change, however the license use/ownership is transferable between users dependent on physical ownership of the primary vehicle communication device.

2—Registering the vehicle communication device with the present service or pre-registering to associate the user with the user's vehicle.

3—Creating an online account with the present service to register pertinent contact, preference and emergency contact information.

4—Installing the mobile application for use by the user on appropriate device(s).

5—Logging in to the mobile application to connect with user account.

Vehicle

For the vehicle, the system works with any standard motor vehicle which contains OBD-II standard diagnostic connector and specified pinout and electrical signaling protocols/message format.

Mobile Device

For the mobile device, the system requires the use of a standard mobile device that can run the mobile application. The mobile device may comprise elements of mobile phone, smart watch and other smart devices that contain an ability to communicate to the communication service, such as cellular communication, WiFi, Bluetooth or other capable communication methods.

Vehicle Communications Device

For the vehicle communications device, the system utilizes a communication-capable OBD-II Device (vehicle communications device) that communicates vehicle dashboard codes and information to the communication service.

The vehicle communications device may be specifically manufactured for or by the manufacturer or may be part of a licensed partnership which allows a device to communicate with the communication service. Each vehicle communications device is assigned an identification number unique to the device. This number is used during registration processes to associate the vehicle communications device with the user account.

The vehicle communications device (also referred to herein as the vehicle system device) is used to facilitate communication from the vehicle computing system to the users mobile device via the communication service and vice versa. The vehicle communications device contains an ability to communicate to the communications service by cellular communication, Wi-Fi, Bluetooth or other capable communication methods.

Vehicle environment conditions and vehicle-specific data which are transmitted to the communication service are comprised of data available to the vehicle communications device through the OBD-II interface. This is not limited to only OBD-II communication and may include other Internet Of Things (IOT) devices capable of either interfacing with vehicle communications or performing independent recording of data.

Vehicle environment data may include but is not limited to: door status (are any of the doors opened or closed), window status (are any of the windows opened or closed), environment control system (ex. The status of heat/air conditioning systems) status, cabin temperature, sound/audio, current angle/inclination of the vehicle, engine status (is the engine on or off and are there any errors associated with the engine), gas status/amount (what is the amount of gas in the system and will this cause the engine to stall and thus the other internal systems to shut off), and engine temperature.

Through GPS-enabled vehicle communications device, additional vehicle data may include but is not limited to: latitude & longitude, and speed & direction.

Communication Service

The system utilizes a web-based Application Protocol Interface (API) to communicate with communication-enabled devices including the vehicle communications device and mobile device.

The communication service interacts with the user data and preferences of the system and relays data, commands and information as governed by the present software, rules, processes, algorithms, artificial intelligence and rules engines developed for the purpose of operating and maintaining the data related to the system and functionality.

Mobile Application

The system utilizes a mobile application to allow the user to monitor vehicle conditions communicated through the communication service. As an example, the process of communication follows this cycle of information flow from vehicle to mobile device:

1—Vehicle data & environment data is read by the vehicle communications device;

2—The vehicle communications device transmits the data to the communication service at a server over the network;

3—The communication service records data within the system;

4—The system communicates with the mobile device to relay appropriate alerts, messages and condition updates to the mobile application over the network.

5—The mobile application communicates data, including mobile device connection status back to the communication service;

6—If connection is not maintained with the mobile device, the system communicates to the user's specified alternate communication methods including SMS text message, voice mail alert, and alternate contact person SMS text message and voice mail alert.

7—The user may interact with the mobile application to issue a command for the vehicle;

8—The mobile application communicates the command to the communication service;

9—The communication service communicates to the vehicle communications device;

10—The vehicle communications device transmits the command to the vehicle through the OBD device, fuse/relay and other applicable action methods;

11—The vehicle communications device reads vehicle data & environment data and repeats the cycle (steps 1-10).

The following detailed description of operations (in some embodiments) refers to FIGS. 3-20.

Operation

The following is a discussed on various methods and systems in conjunction with FIGS. 3-20 and is only described as only some embodiments of the present invention.

Figure 3:
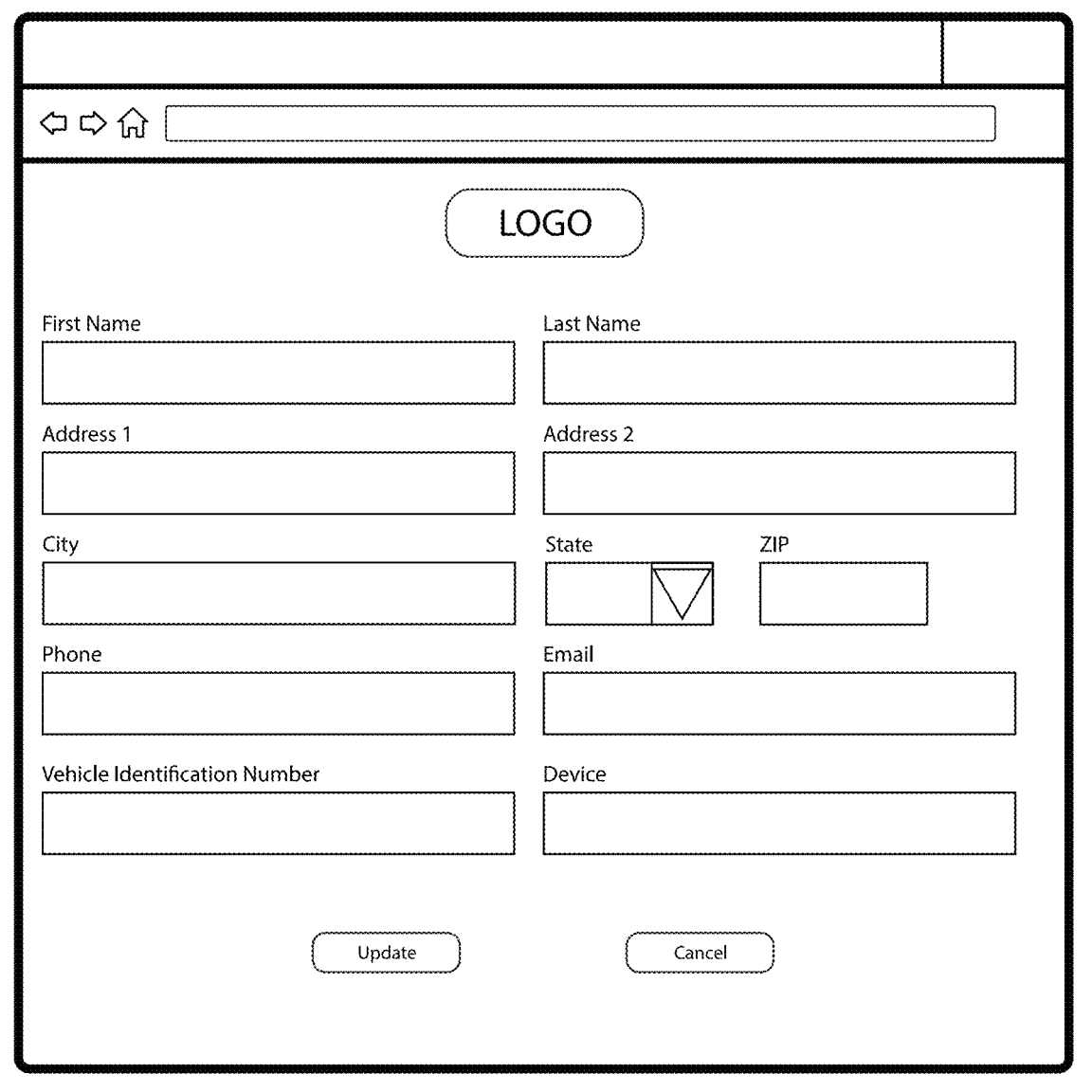

First, in FIG. 3, the user completes online registration with a service through a GUI of a website or affiliate/partner website. The intent of registration is to receive user information and also to connect the appropriate vehicle identification number and the device information of the user. Submitting this form could save this data in the communication service in a database that is accessible to the vehicle and the user's mobile device.

Figure 4:
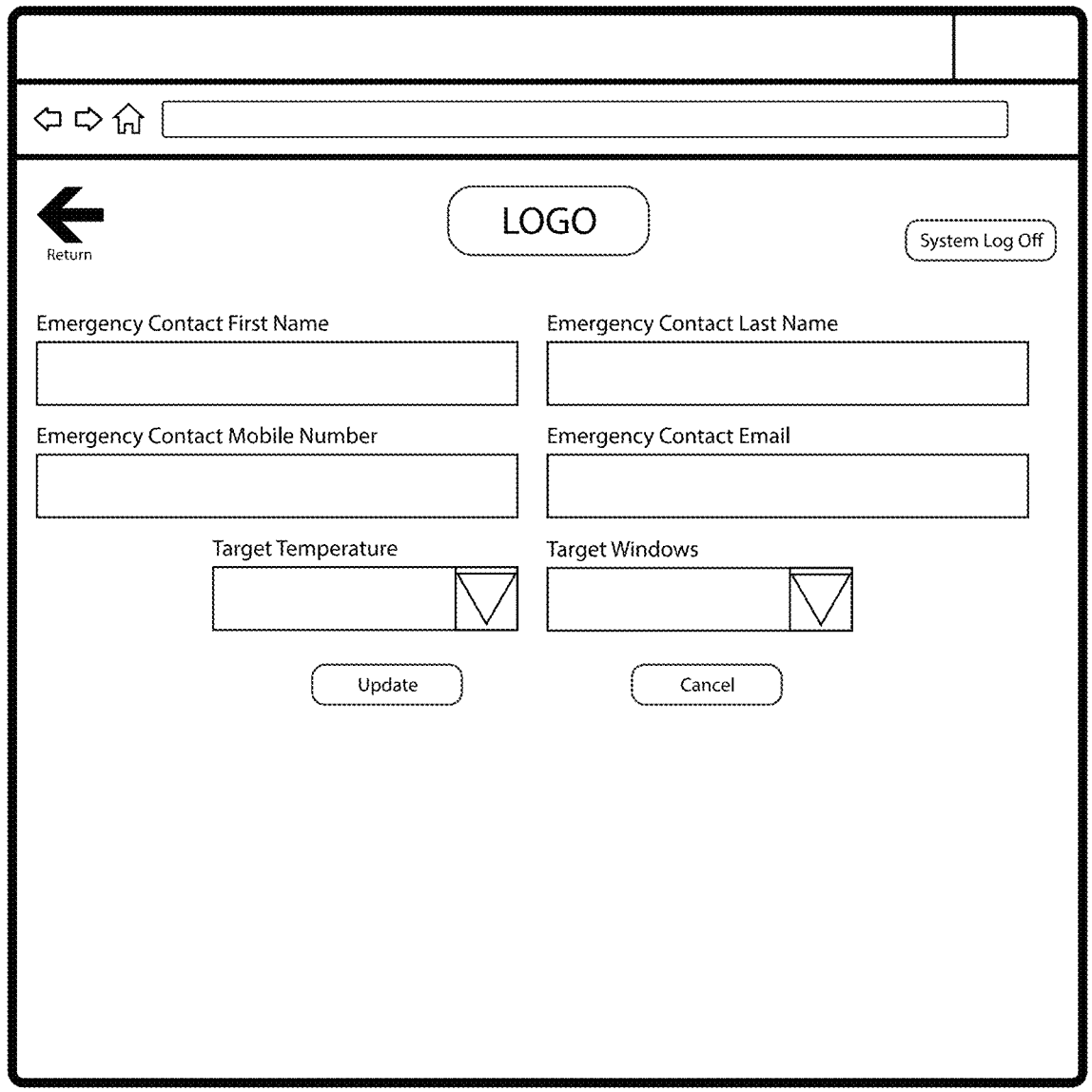
FIG. 4 is a graphical user interface of a personal computer for setting web settings of remotely-controlled vehicle operations according to one embodiment.

In FIG. 4, the user completes the entry of preferences and settings in multiple locations. These settings are stored as part of the information of the user account. The user may enter or update these preferences through the website service when logged in to their user account. As shown, the user can insert the user's target temperature and target windows for control. The system will then automatically control the vehicle so that the target temperature that is set is maintained or if not, the target windows could be rolled down in the event, for example, that the temperature in the vehicle cabin is higher than a predefined threshold.

Figure 5:
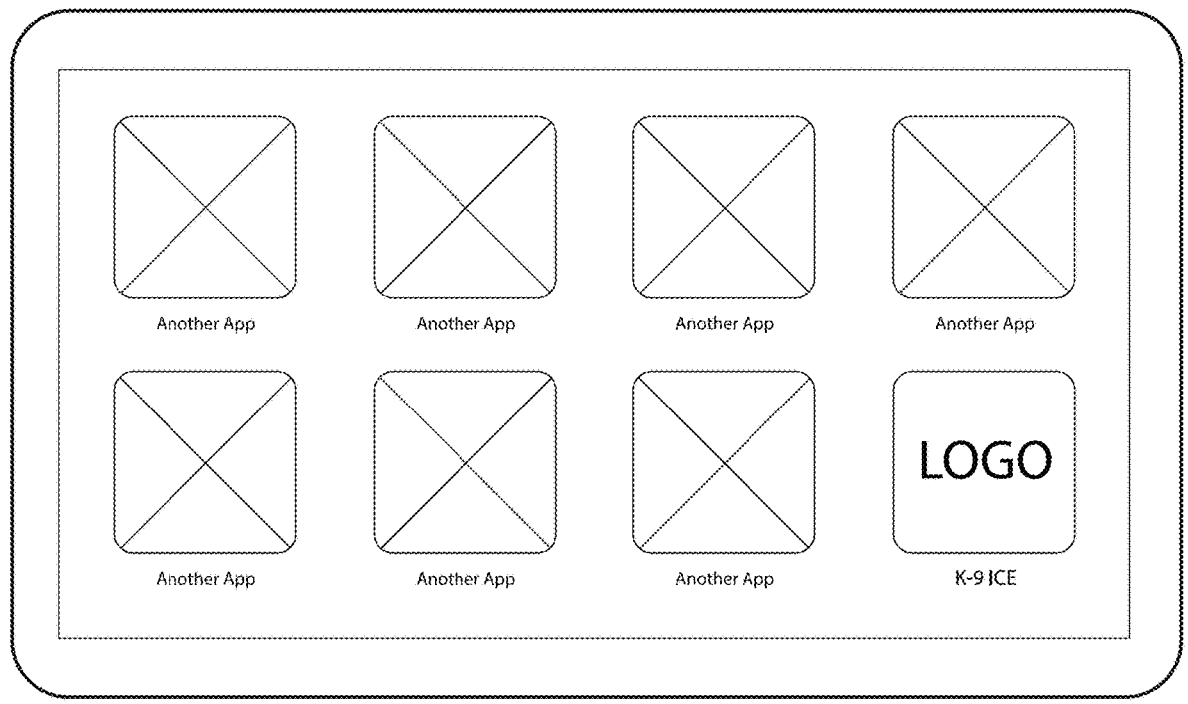
FIG. 5 is a graphical user interface on a vehicle for launching the remotely-controlled vehicle operations according to one embodiment.
Figure 6:
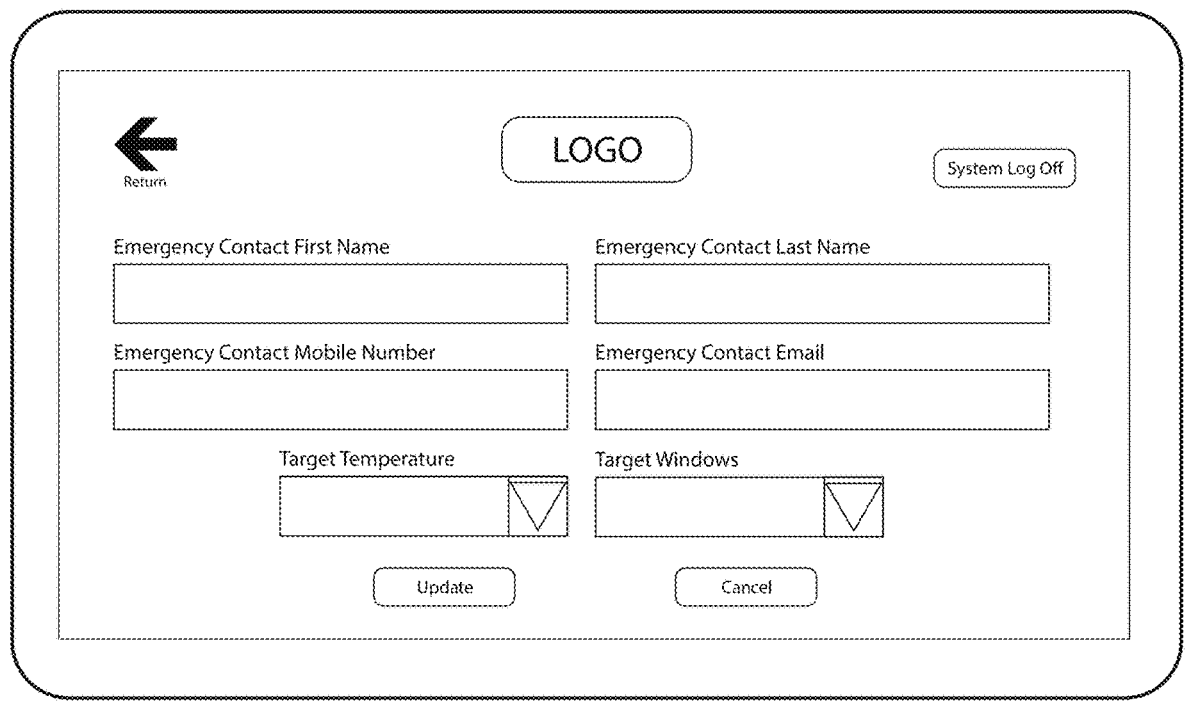
FIG. 6 is a graphical user interface on a vehicle for programming settings for the remotely-controlled vehicle operations according to one embodiment.

FIGS. 5-6 illustrates the in-dash device of a vehicle under one embodiment. As shown in FIG. 5, a vehicle equipped with a capable communications device with the in-dash device and screen can perform the functions of the present application within the screen/console instead of using a mobile device over a network. Launching the in-dash application may be performed by clicking (touching, pressing) the appropriate marker (button, icon) to start the in-dash application. The in-dash application then can control the temperature of the vehicle and can perform functions of controlling the internal cabin climate automatically based on threshold values (temperature, target windows, etc.) set.

In FIG. 6, similar to FIG. 4, the user completes the entry of preferences and settings in multiple locations. These settings are stored as part of the information of the user account. The user may enter or update these preferences through the communications device when it is a vehicle which is equipped with a capable in-dash device and screen. The user may enter or update these preferences through this type of communications device when it is logged in to their user account.

Figure 7:
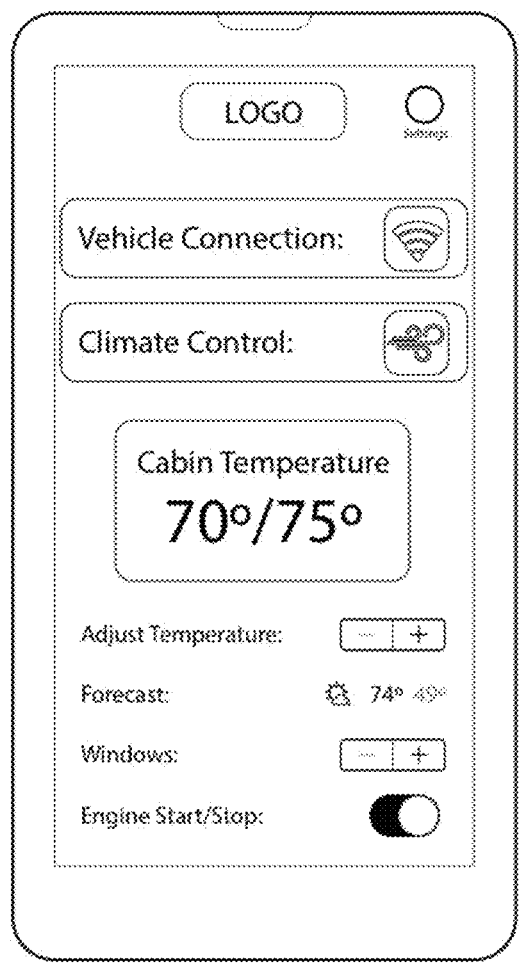
FIG. 7 is a graphical user interface on a mobile computing device for the remotely-controlled vehicle operations according to one embodiment.
Figure 8:
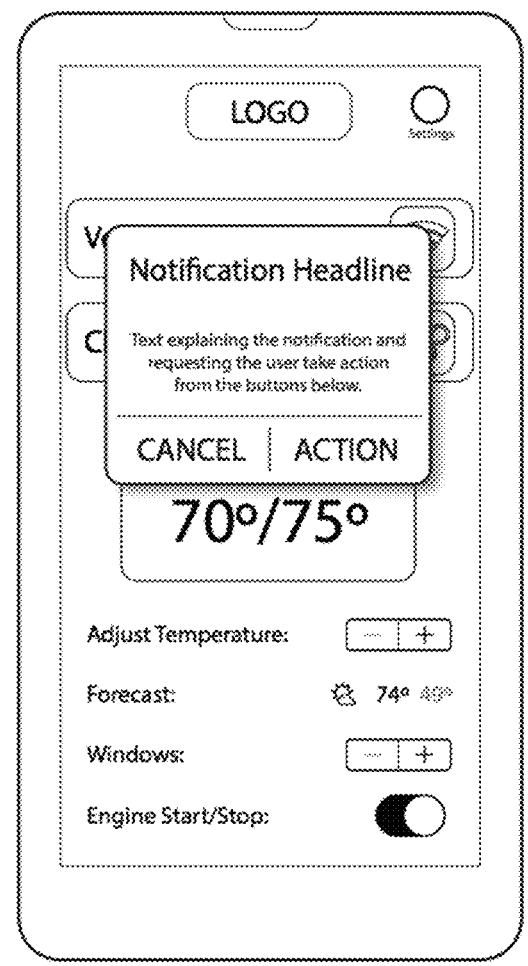
FIG. 8 is the graphical user interface of FIG. 7 showing a notification according to one embodiment.
Figure 9:
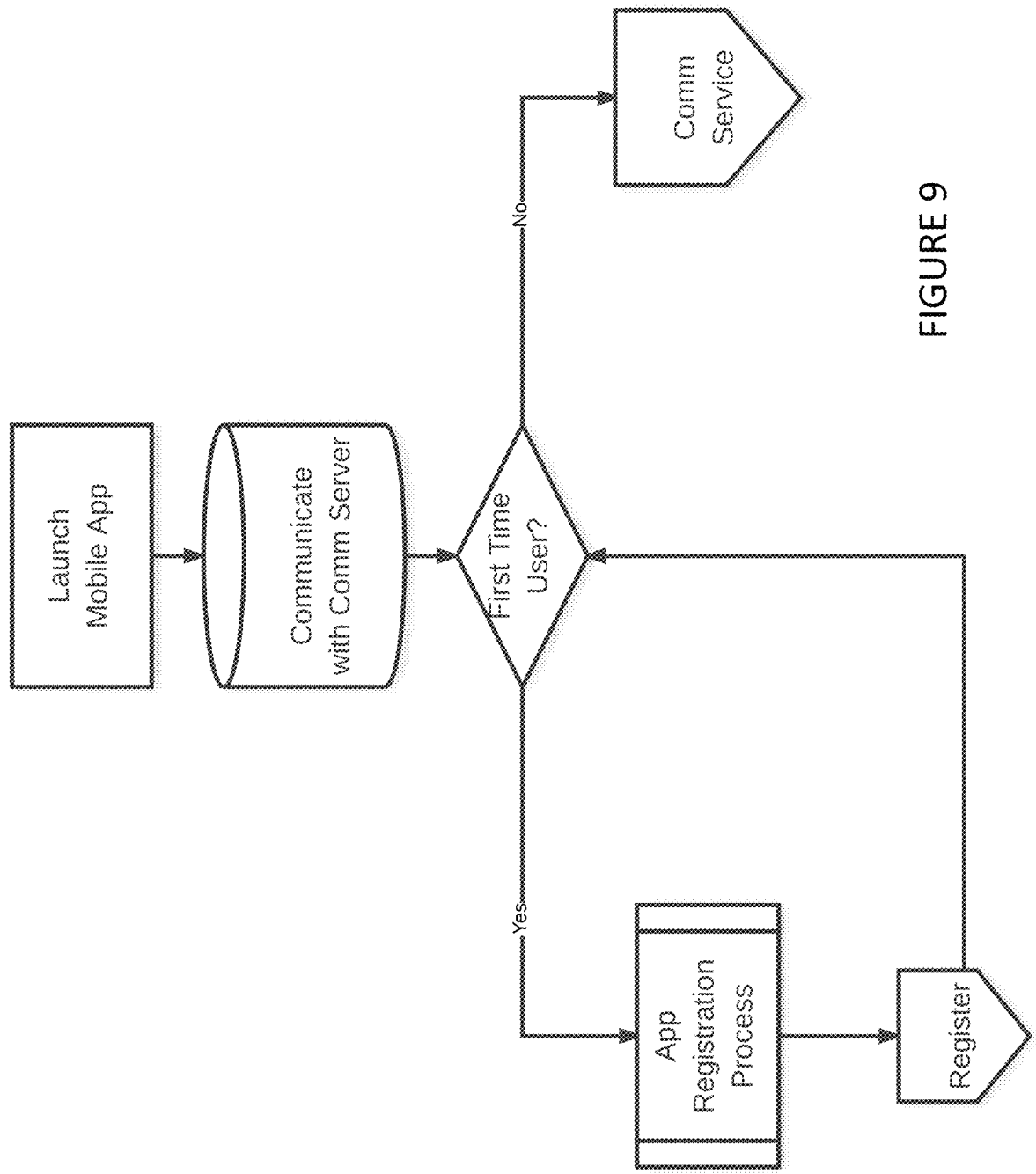
FIG. 9 is a method of mobile device initialization and performing actions based on preference settings for the remotely-controlled vehicle operations according to one embodiment.

In FIGS. 7-8, the user is presented with the primary environment data and settings and statuses on main screen of the mobile application via GUIs. These environment data points allow the user to, at-a-glance, discern the current status of the vehicle environment (temperature of the cabin, the status of the vehicle connection, climate control, etc.) and make decisions for actions to take or commands to send to adjust the vehicle environment, including adjusting temperature and/or windows and/or starting or stopping the engine. FIG. 9 shows a notification that may be displayed on the GUI after an event has occurred.

Figure 14:
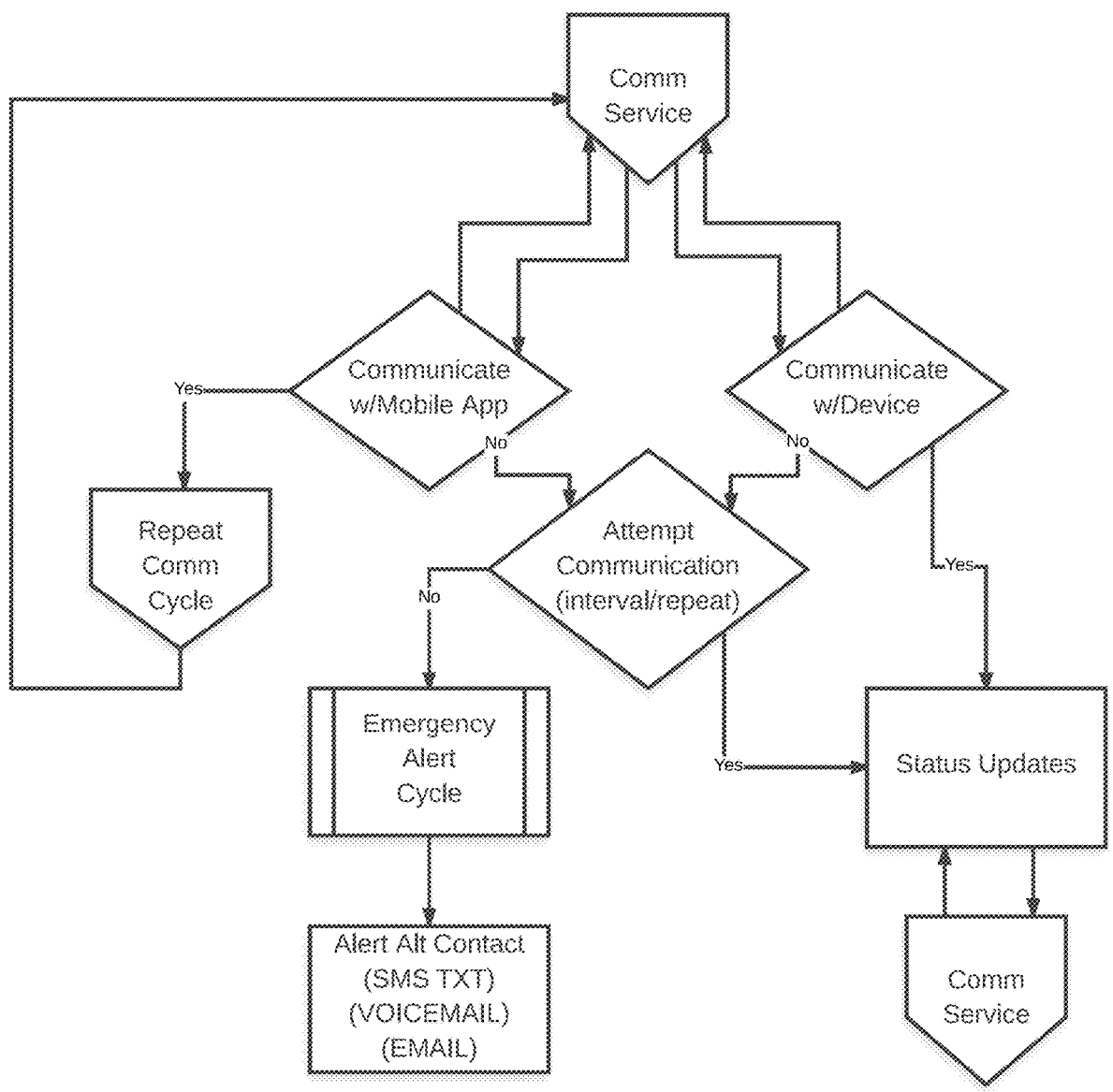
FIG. 14 is a diagram showing an operation scenario where the user adjust the environment manually according to one embodiment.

FIG. 9 is a method of mobile device initialization and performing actions based on preference settings for the remotely-controlled vehicle operations according to one embodiment. In FIG. 9, the user launches the mobile application. Then, the mobile application checks to see if this is the first time the mobile application has been launched by the user. If yes, then the registration process begins. If no, then preferences are read and communication service begins (FIG. 14).

Figure 10:
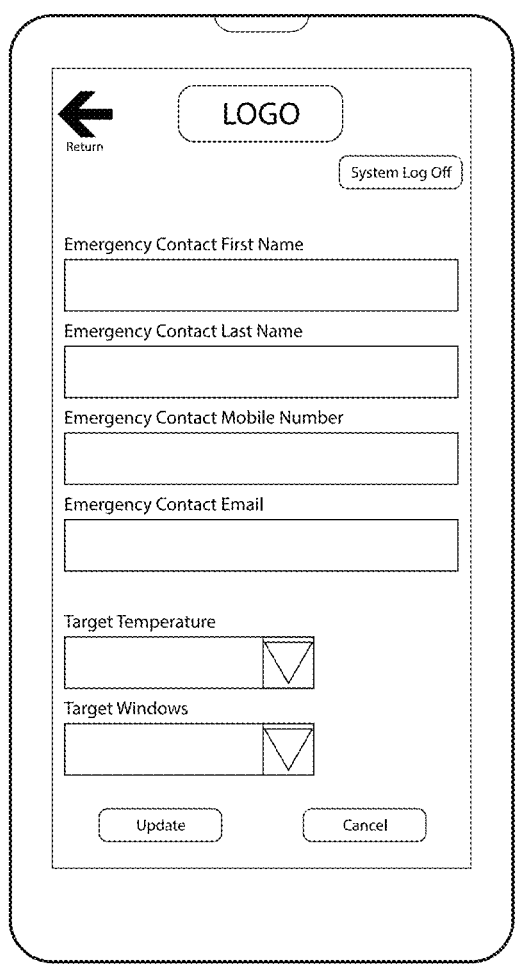
FIG. 10 is a graphical user interface showing a page for inputting settings on a mobile computing device for the remotely-controlled vehicle operations according to one embodiment.

FIG. 10 is a graphical user interface showing a page for inputting settings on a mobile computing device for the remotely-controlled vehicle operations according to one embodiment. In FIG. 10, similar to FIGS. 4 and 6, the user completes the entry of preferences and settings in multiple locations. These settings are stored as part of the information of the user account. The user may enter or update these preferences through the mobile application when it is logged in to their user account. Additional mobile application settings may be present in this screen in addition to the standard preferences/settings. These include application-specific settings specific to the device or platform such as "run-in background," "allow push-alerts" and similar settings.

Figure 11:
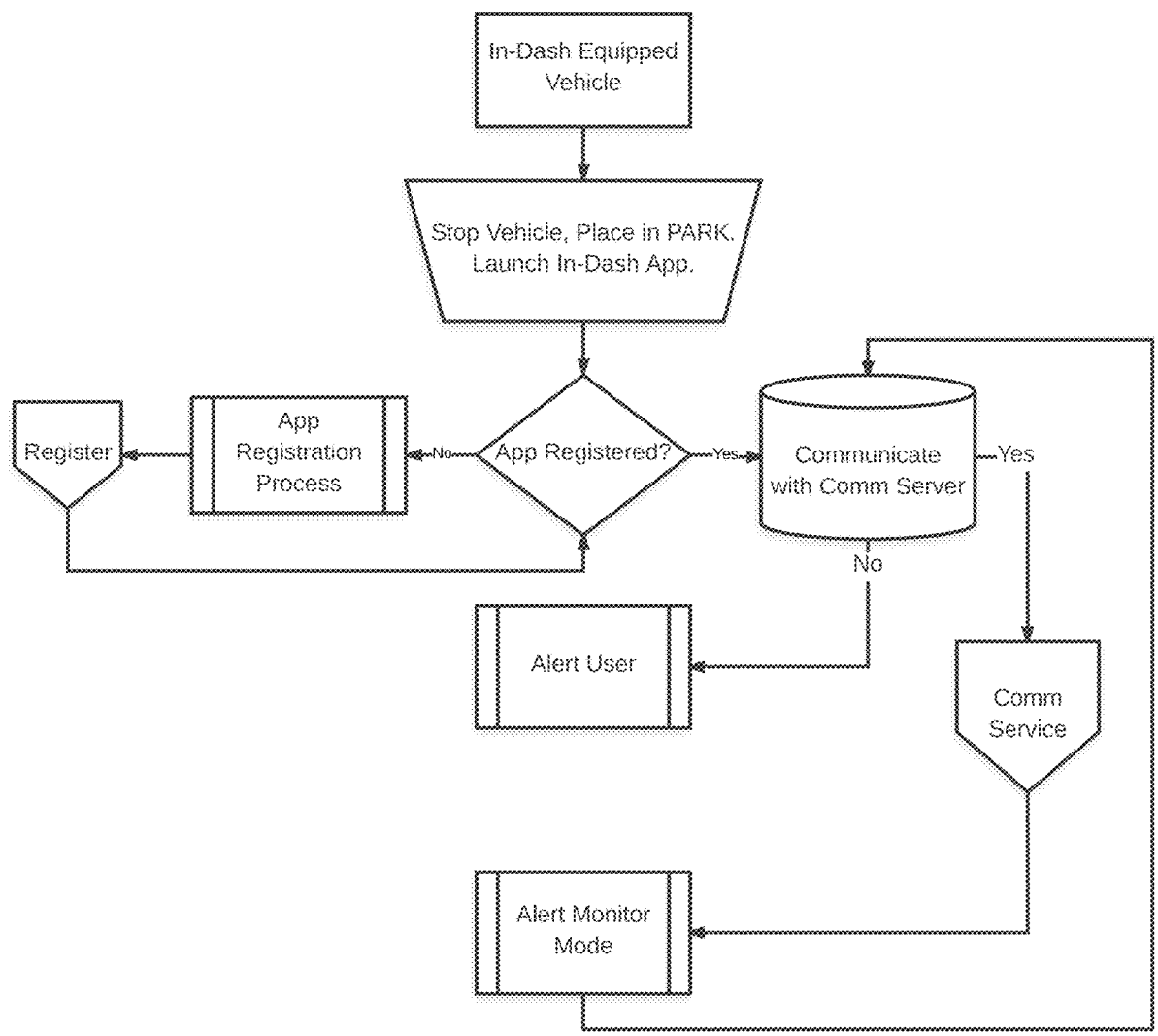
FIG. 11 is a flow chart showing an operation initialization procedure of an on board diagnostic system (OBD-II) of remotely-controlled vehicle operations according to one embodiment.
Figure 12:
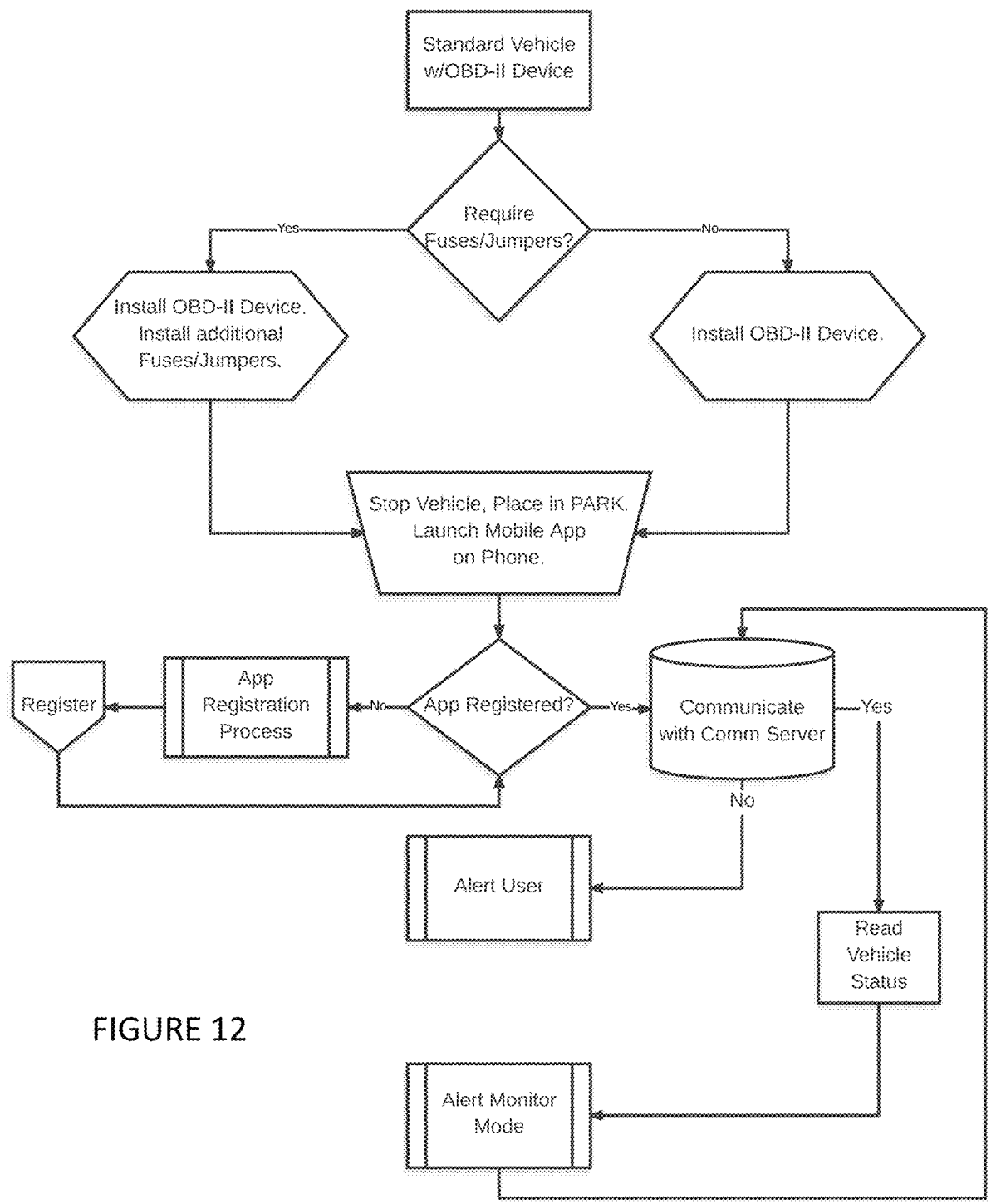
FIG. 12 is a diagram showing a communication service default communication cycle according to one embodiment.

FIG. 11 is a flow chart showing an operation initialization procedure of an on board diagnostic system (OBD-II) of remotely-controlled vehicle operations according to one embodiment, and FIG. 12 is a diagram showing a communication service default communication cycle according to one embodiment. Regarding FIGS. 11-12, within the mobile application main GUI screen, the user may review the environment data through visualizations that help inform the user at a glance the status of an optimum Environment during operation. As mentioned above, the term "environment data" as used herein may be any items that can be monitored and/or controlled via the mobile device, including cabin temperature, windows, sunroof, engine, AC system, heating system, status of any vehicle component, and the like.

General Commands Example

The following review of "general commands" is given as an example of the general process and procedure of reviewing environment data and making a command action to be delivered to the vehicle.

The user begins by adjusting a displayed Environment Data value in the mobile application by clicking, pressing, touching or other gesture actions indicating a value change within the application. Given a mobile device data signal present, this information is communicated to the communications service stores the data/command and delivers the data to the communication device within the vehicle. To the ability present within the vehicle, the command is executed. The data status and update cycle continues then with the standard cycle of system communication to update the communication service of the new status and data value, updating it to the mobile application.

The following specific examples outline details for a few specific types of exemplary commands and adjustments of the environment which can be manually performed by the user through the mobile application.

Temperature Control Command Example

The temperature controls within the mobile application allow for commands to be relayed to the vehicle for the maintenance of the environment's cabin temperature. Depending on vehicle capability, multiple different options are present for signal type, control/command information, etc. When this feature is not present in a vehicle, the communication device, or user settings disable the temperature control feature in the mobile application and limit it to a data display feature within the mobile application. In that circumstance, the window control is the only ability for environment temperature adjustment.

The user begins by clicking, pressing, touching or other gesture actions indicating a value change within the mobile application for the Engine Status.

Given a mobile device data signal present, this information is communicated to the communication service which stores the data/command and delivers the data to the communication device within the vehicle. To the ability present within the vehicle, the command is executed by the vehicle (e.g., the windows are rolled down or up, the heat is turned on, the AC is turned on, the engine is started, etc.). This is discussed more in depth herein Once the command is executed, the data status and update cycle continues then with the standard cycle of system communication to update the communication service of the new status and data value, updating it to the mobile application.

Engine On/Off Command Example

These controls allow for an engine-start equipped vehicle to turn on and off the engine based on the appropriate command provided by the user via the user's mobile device, for example. When this feature is not present in a vehicle, the communication device, or user settings disable this feature in the mobile application.

The user begins by clicking, pressing, touching or other gesture actions indicating a value change within the mobile application for the engine status (e.g., stop running or start running).

Given a mobile device data signal present, this information is communicated to the communication service which stores the data/command and delivers the data to the communication device within the vehicle. To the ability present within the vehicle, the command is executed. The data status and update cycle continues then with the standard cycle of system communication to update the communication service of the new status and data value, updating it to the mobile application.

Window Control Command Example

The user begins by clicking, pressing, touching or other gesture actions indicating a value change within the mobile application for the window position controls (e.g., how far to roll down/up one or more windows of the vehicle). These controls allow for an up action or down action button click to adjust the vehicle windows based on the settings values for window increment.

Given a mobile device data signal present, this information is communicated to the communication service which stores the data/command and delivers the data to the communication device within the vehicle. To the ability present within the vehicle, the command is executed. With window commands, the appropriate action for up command or down command is delivered for the appropriate window increment value (from user Settings) in duration, repeat loop or term based on appropriate vehicle capability.

The data status and update cycle continues then with the standard cycle of system communication to update the communication service of the new status and data value, updating it to the mobile application.

Figure 13:
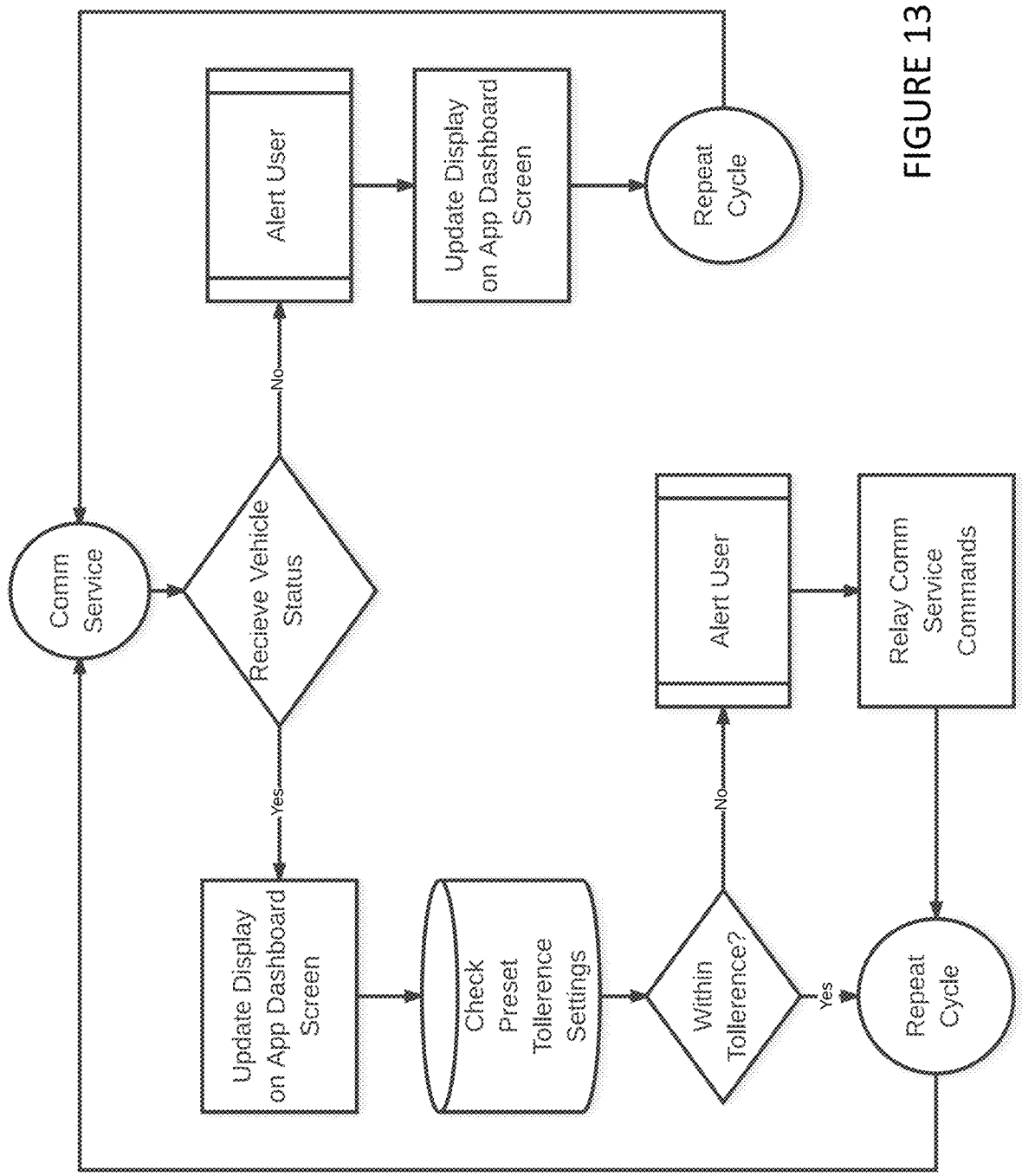
FIG. 13 is a diagram showing a communication service action communication cycle according to one embodiment.

FIG. 13 is a diagram showing a communication service action communication cycle according to one embodiment. Regarding FIG. 13, this diagram outlines the default or standard communication cycle referenced in several of the other diagrams as well as the communication service. This standard communication cycle description explains the points of conditions and process to further action or loop within the cycle.

The cycle begins as data is received from the communication device. In the event that there is no data received or communication is lost with the communication device, then the emergency alert cycle begins, which is discussed more in depth herein and shown in FIG. 14.

If the communication process is successful, the updated data is communicated to the mobile application. Within the mobile application, the preset user settings for desired environment temperatures (and other environmental conditions), tolerance and thresholds are evaluated against the updated data. If a data value is outside of the desired range, then the user is alerted by the display of alert messages on screen. If the data value is within the desired range, then the cycle begins again.

FIG. 14 is a diagram showing an operation scenario where the user adjusts the environment manually according to one embodiment. In FIG. 14, the communication service attempts to communicate with both the mobile application and the vehicles communication device. In the event that communication is not established and maintained with each, the process can move into an emergency alert cycle.

Then, if communication occurs between the mobile application of the mobile device and the communication service is successful, the standard operation proceeds and the communication cycle begins again. If communication is not successful, then the communication service will attempt communication again in cycle. If communication continues without success, then the emergency alert cycle begins in which alternate contact methods are made to reach the user and eventually emergency alternate contact persons, as discussed in more depth herein.

The communication service then communicates with the communication device within the vehicle. If such communication is successful then environment data and status information is updated during the return/standard cycle of communications. In the event that communication is not established and maintained with the communication device then the emergency alert cycle begins, as discussed herein.

Temperature Control Command Scenario

Depending on the type of communication device and features of control available to the device by the vehicle, the type of control over the temperature can be different. This diagram details that, regardless of type of input and command data present, the structure of action remains the same in communication with the communication device.

The communication device may deliver commands to the vehicle in terms of the following:

Environmental Control System (Heating/Cooling System) Temperature Degree as a setting of Target Degree, Environmental Control System (Heating/Cooling System) Temperature Degree as a setting of Temperature Degree Up/Down, Environmental Control System (Heating/Cooling System) Air Flow (Speed) Up/Down (Increase/Decrease), and/or Environmental Control System (Heating/Cooling System) On or Off status.

Figure 15:
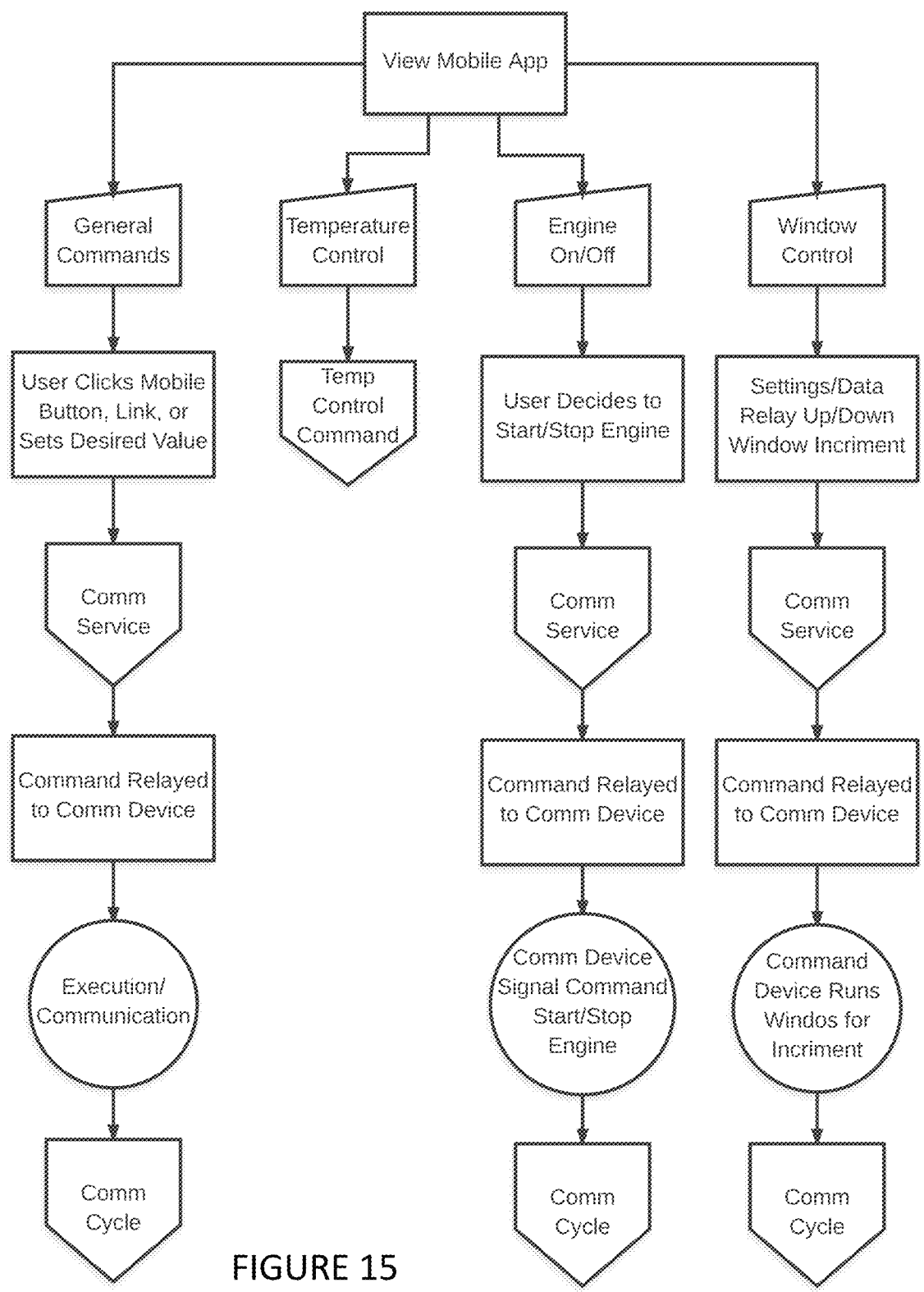
FIG. 15 is a diagram showing a temperature control command scenario according to one embodiment.
Figure 16:
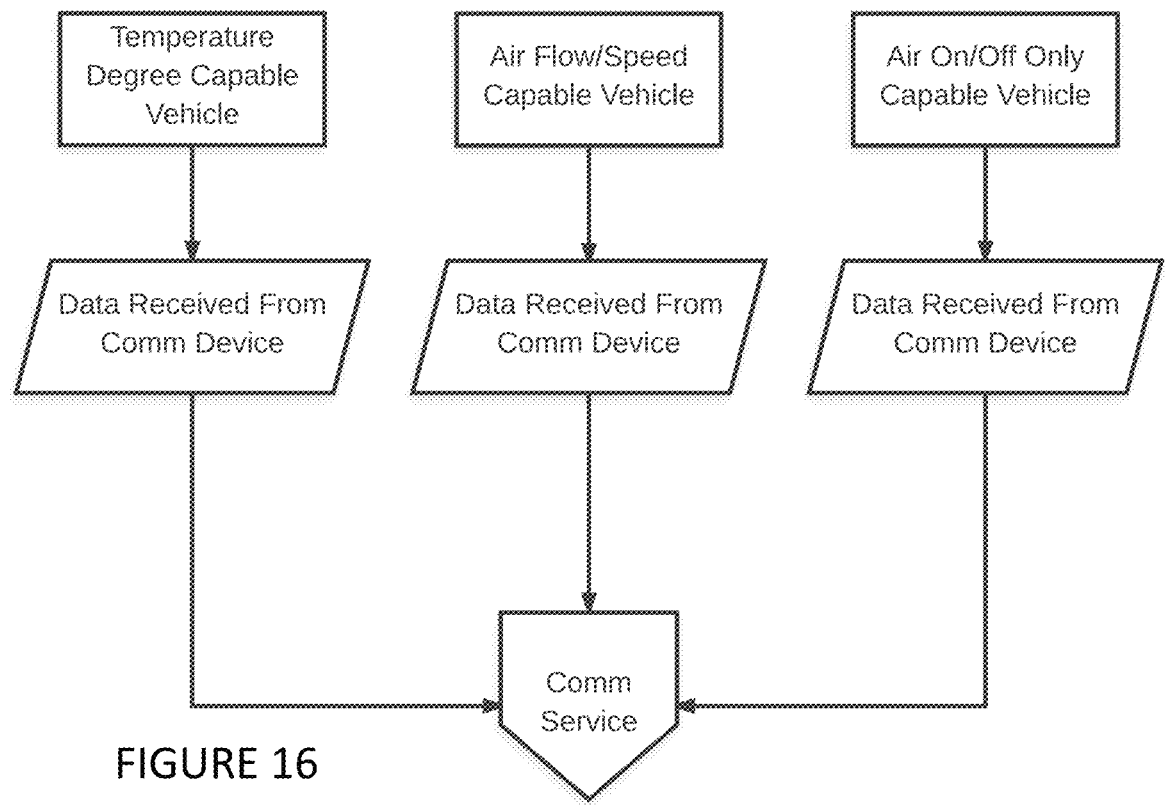
FIG. 16 is a diagram showing signal lost operation scenario for a mobile device application according to one embodiment.

FIG. 15 is a diagram showing a temperature control command scenario according to one embodiment, and FIG. 16 is a diagram showing signal lost operation scenario for a mobile device application according to one embodiment. Execution of the commands are shown in FIG. 15 which is the process executed by the mobile application under user control. Once these commands have been executed per FIG. 15, FIG. 16 illustrates the flow of data through the communication service and the communication device.

For vehicles which are not equipped with environmental control systems which communicate data to and/or are capable of receiving commands from the communication device, the user is able to control environment temperature through the control of window commands for up/down based on user settings window increment value.

Figure 17:
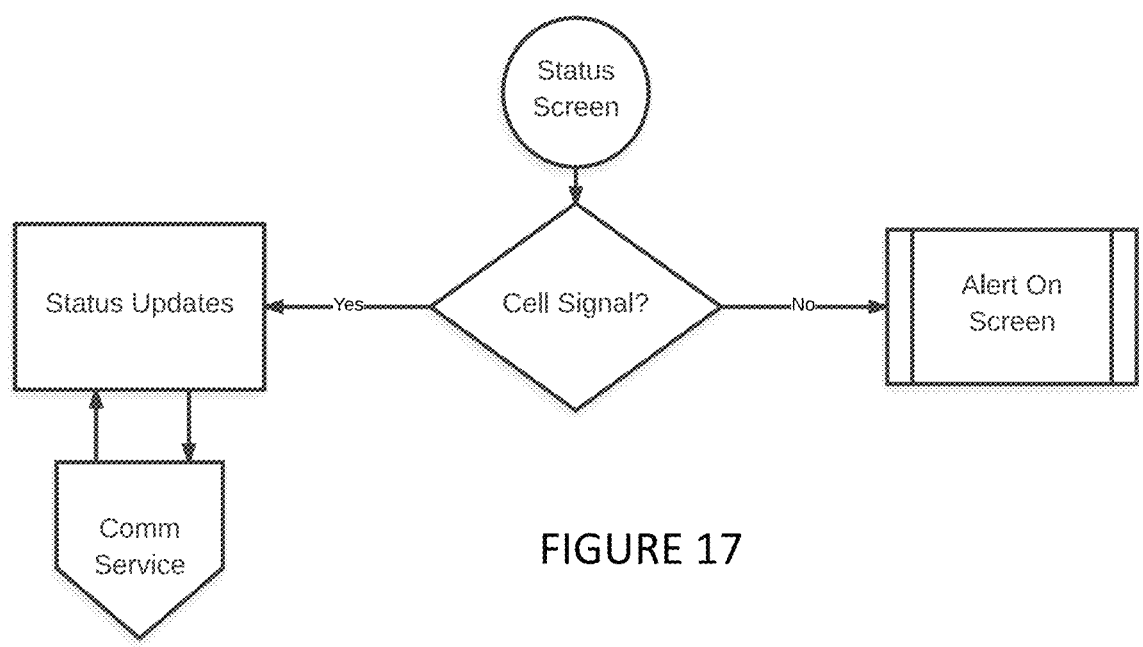
FIG. 17 is a diagram showing an operation scenario where the user adjust the environment manually according to one embodiment.

FIG. 17 is a diagram showing an operation scenario where the user adjust the environment manually according to one embodiment. As shown in FIG. 17, independent of communication status with the communication service, the mobile application can detect whether a mobile device data signal (cellular, Wi-Fi, Bluetooth, etc.) is not present and, if data from with the communication service has not been updated within the set timeline, then the mobile application can display a "lost connection" alert in the application.

Figure 18:
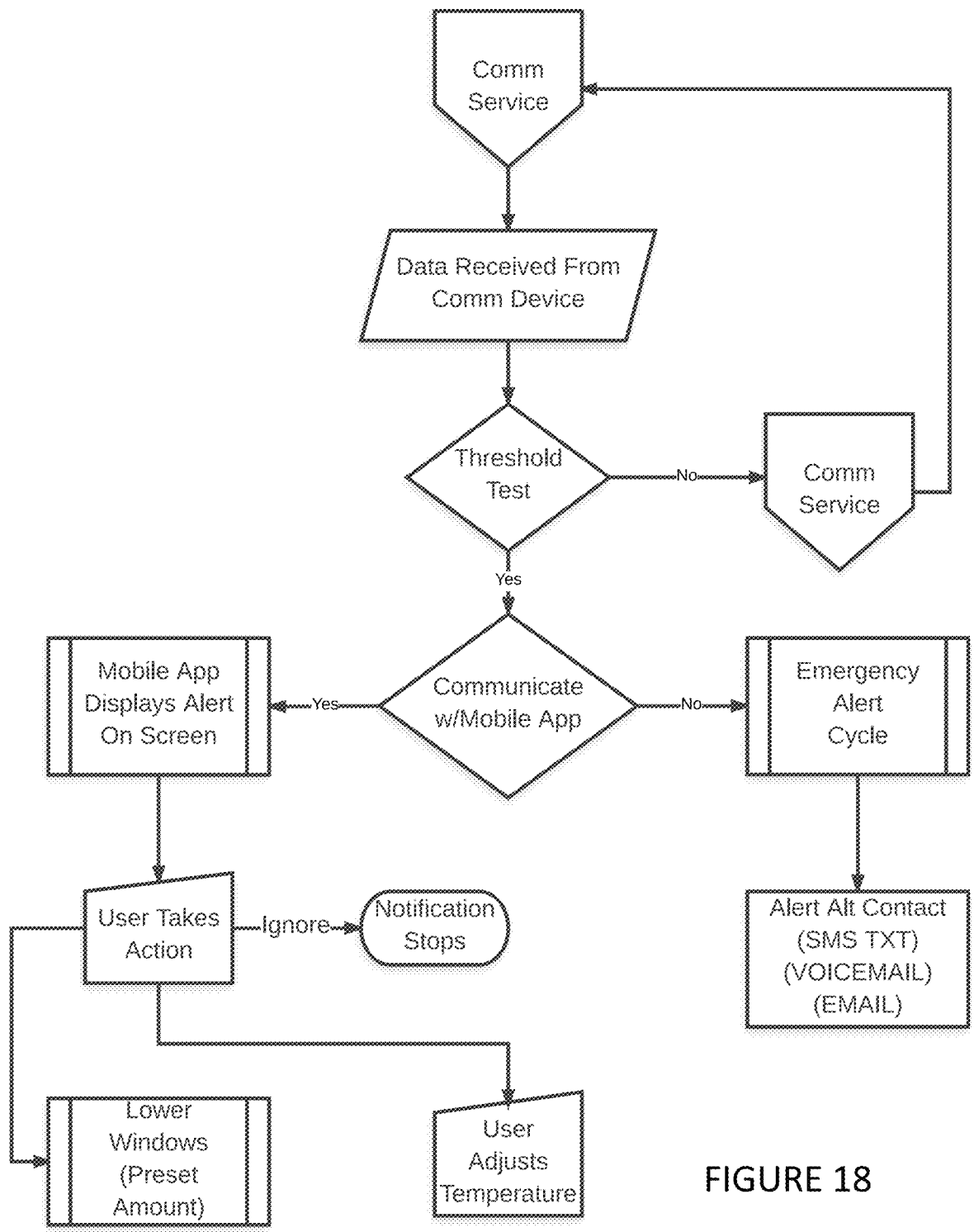
FIG. 18 is a diagram showing an action scenario issuing a high temperature alert according to one embodiment.

FIG. 18 is a diagram showing an action scenario issuing a high temperature alert according to one embodiment. In FIG. 18, the associated environmental data is transmitted from the communication device to the communication service. The present system evaluates the cabin temperature (from capable communication devices) or processed algorithm of outside/local temperature and engine temperature and determining factors to perform the environment temperature threshold test. When the temperature is above the desired threshold level then the alert process proceeds to "Yes" as shown in FIG. 18; otherwise the process continues to proceed to the communication service and cycles back to the beginning of FIG. 18 to continuously monitor the conditions of the vehicle.

If the communication service is able to connect to the mobile application, then an alert is displayed within the application and the user is allowed to take action including adjusting the temperature of the cabin by adjusting the AC output or the heating output of the vehicle AC/heat systems or the user can lower the windows (or raise the windows) by a preset amount of fully. If the mobile device allows for push notifications and other special focus or priority alerts, then one is triggered within the mobile device.

Figure 19:
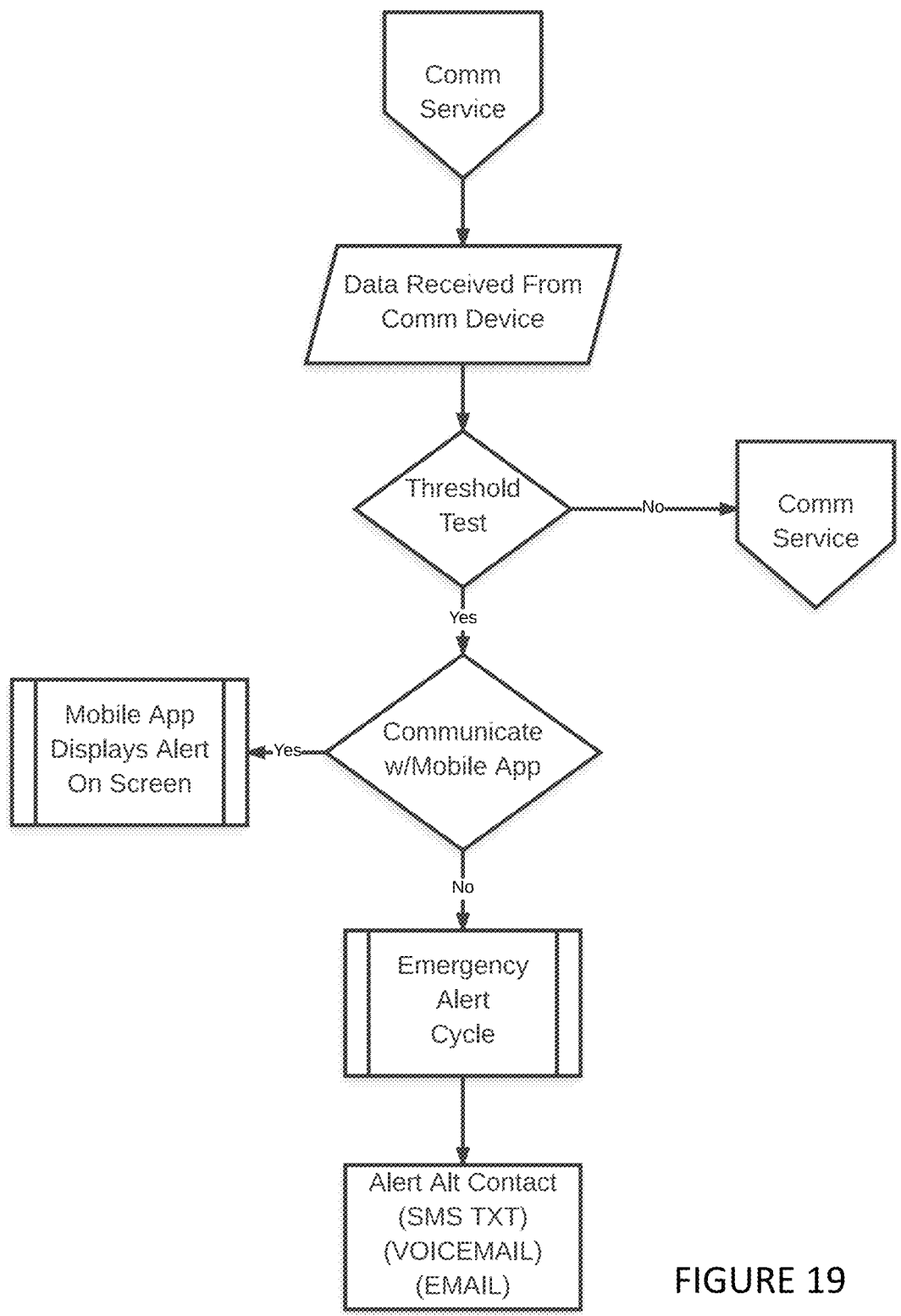
FIG. 19 is a diagram showing an action scenario engine issuing a low failure alert according to one embodiment.

FIG. 19 is a diagram showing an action scenario engine (such as issuing a low failure alert) according to one embodiment. When a vehicle is left running/idling in a parked location, with the heating/cooling system running to maintain a stable environment temperature, maintaining, the vehicle's engine-running status is of primary importance. When a vehicle has been left with the engine on either at initial state or being switched on through the communication device (in function capable vehicles), the engine running state is recorded. When the communication service receives a status of engine off when the previous communication cycle's status was engine on, this indicates that the vehicle has been turned off within the last cycle and can indicate an engine failure.

The associated environmental data is transmitted from the communication device to the communication service. If the communication service is able to connect to the mobile application, then an alert is displayed within the application. If the mobile device allows for push notifications and other special focus or priority alerts, then one is triggered within the mobile device.

In the condition that the communication service is unable to connect to the mobile application then the emergency alert cycle begins with a goal of reaching the user through alternate contact methods including SMS text message, phone call with automated voicemail message, and email to the user and, based on user preferences and settings, subsequently performing the same contact methods and actions for the specified emergency contact person.

A function capable communication device can transmit data of the vehicle's location via GPS coordinates. The location is registered at initial stop/activation state and then is monitored during the standard communication cycle as part of environment data. A change in the GPS location, especially over several points of reported location, can be an indication that a vehicle is being driven or has been moving during towing, or may have a rolling vehicle situation which needs attention.

Figure 20:
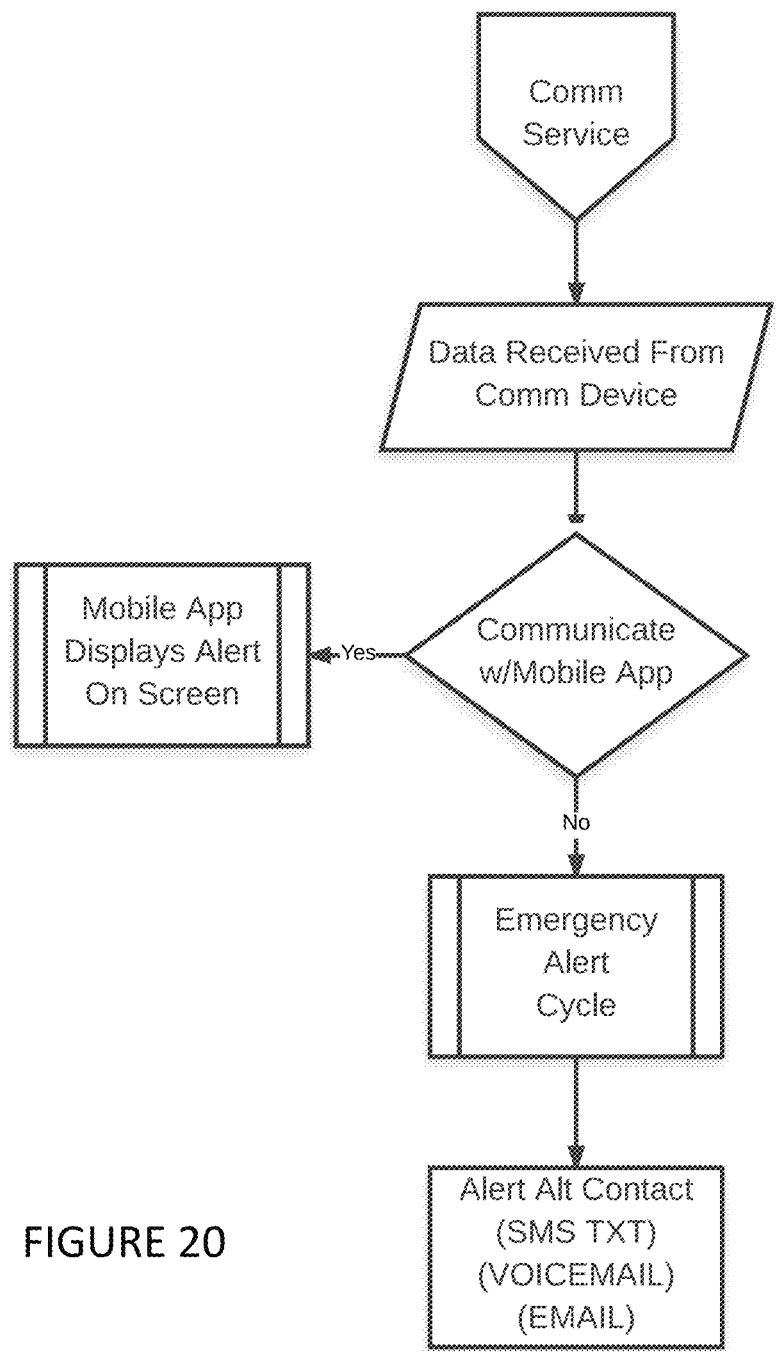
FIG. 20 is a diagram showing an operation scenario where the user adjust the environment manually according to one embodiment.

FIG. 20 is a diagram showing an operation scenario where the user adjusts the environment manually or the vehicle is being towed according to one embodiment. Accordingly, a function capable communication device can transmit data of the vehicle's angle of incline as compared to initial stop/activation state. This inclination data can be an indication that a vehicle has been lifted for towing.

The associated environmental data is transmitted from the communication device to the communication service. If the communication service is able to connect to the mobile application, then an alert is displayed within the application. If the mobile allows for push notifications and other special focus or priority alerts, then one is triggered.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including a programming language that works with OBD-II connection. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

The invention claimed is:

1. A vehicle interface system for a vehicle, the vehicle interface system comprising:
    a vehicle computing system comprising a sensor that is configured to collect cabin conditions including cabin temperature of the vehicle;
    a vehicle computer that comprises one of an in-board computer or an on board diagnostic (OBD) device attached to the vehicle, the vehicle computer is configured to communicate data collected from the vehicle computing system to a communication service over a network; and
    a mobile device that comprises a processor and that is connected remote from the vehicle over the network, the mobile device being configured to connect to the network to obtain the data from the vehicle computer and to receive a command from a user to control one or more components of the vehicle to control the internal temperature of the cabin of the vehicle,
    wherein, in response to the sensor detecting the cabin temperature of the vehicle reaches a predetermined threshold, the vehicle interface system is configured to send a first alert to the mobile terminal,
    in response to determining that the first alert reached the mobile terminal, and a command has been sent, the vehicle interface system is further configured to lower a window of the vehicle a pre-set amount and to send a high temperature alert to the mobile device, and
    in response to determining that the first alert has not reached the mobile terminal indicating that communication has not been made with the mobile terminal, sending a second alert via a method of transmission different than the first alert.

2. The vehicle interface system of claim 1 wherein the one or more components of the vehicle comprises the windows such that the user controls operation of the windows remotely from the user's mobile device.

3. The vehicle interface system of claim 1 wherein the one or more components of the vehicle comprises a heating or air conditioning systems of the vehicle such that the user controls operation of the heating or air conditioning systems remotely from the user's mobile device.

4. The vehicle interface system of claim 1 wherein the network is a cellular network.

5. The vehicle interface system of claim 1 wherein the one or more components of the vehicle comprises all of the windows, heating system, and air conditioning system of the vehicle such that the user controls operation of the windows and heating or air conditioning systems remotely from the user's mobile device.

6. The vehicle interface system of claim 1 wherein the OBD device receives information when an engine of the vehicle stops running and sends a notification to the mobile device.

7. A vehicle comprising:
   a vehicle interface system comprising:
      a vehicle computing system comprising a sensor that is configured to collect cabin conditions including cabin temperature of the vehicle; and
      a vehicle computer that comprises one of an in-board computer or an on board diagnostic (OBD) device attached to the vehicle and configured to communicate data collected from the vehicle computing system to a communication service over a network;
   wherein the vehicle computer is configured to communicated with a mobile device over the network, to send the data from the vehicle computer, and to receive a command from a user via the mobile device to control one or more components of the vehicle to control the internal temperature of the cabin of the vehicle,
   wherein, in response to the sensor detecting the cabin temperature of the vehicle reaches a predetermined threshold, the vehicle interface system is configured to send a first alert to the mobile terminal,
   in response to determining that the first alert reached the mobile terminal and a command has been sent, the vehicle interface system is further configured to lower windows of the vehicle a pre-set amount and to send a high temperature alert to the mobile device, and
   in response to determining that the first alert has not reached the mobile terminal indicating that communication has not been made with the mobile terminal, sending a second alert via a method of transmission different than the first alert.

8. A method of controlling an internal cabin temperature of a vehicle, the method comprising:
   obtaining data, via a vehicle computing system comprising a sensor, about an internal temperature of a cabin of a vehicle;
   sending the obtained data, to a vehicle computer, the vehicle system device being attached to the vehicle;
   sending, from the vehicle computer, the obtained data to a mobile device comprising a processor, wherein the mobile device is connected remotely from the vehicle over the network; and
   receiving, at the vehicle computer from the mobile device over the network, a command from a user to control one or more components of the vehicle to control the internal temperature of the cabin of the vehicle;
   transmitting, from the vehicle system device to the vehicle computing system, the command so that the vehicle computing system controls one or more components of the vehicle as instructed by the command;
   in response to the sensor detecting the cabin temperature of the vehicle reaches a predetermined threshold, sending an alert to the mobile terminal;
   in response to determining that the first alert reached the mobile terminal and a command has been sent, the vehicle interface system is further configured to lowering windows of the vehicle a pre-set amount and sending a high temperature alert to the mobile device, and
   in response to determining that the first alert has not reached the mobile terminal indicating that communication has not been made with the mobile terminal, sending a second alert via a method of transmission different than the first alert.

9. The vehicle interface system of claim 1, wherein in response to the sensor detecting the cabin temperature of the vehicle reaching the predetermined threshold, activating alert systems of the vehicle.

10. The vehicle interface system of claim 9, wherein the alert systems of the vehicle comprises one or more of: a horn of the vehicle and lights of the vehicle.

11. The vehicle interface system of claim 1, wherein in response to the sensor detecting the cabin temperature of the vehicle reaching the predetermined threshold, a command is sent to the mobile device which triggers sending of a text or email message sent to one or more pre-selected, pre-stored contacts of the mobile device.

12. The vehicle interface system of claim 1, wherein in response to the sensor detecting the cabin temperature of the vehicle reaching the predetermined threshold, a command is sent to the mobile device which triggers sending of a text or email message sent to all pre-stored contacts of the mobile device.

13. The vehicle interface system of claim 1, wherein lowering the windows the pre-set amount is an amount that is less than an amount to lower the window completely as far as the window can be lowered.

14. The vehicle interface system of claim 1, wherein in response to the sensor detecting the cabin temperature of the vehicle reaching the predetermined threshold, a command is sent to the mobile device which triggers sending of a text or email message sent to predetermined and after the windows are lowered a pre-set amount, the windows are further lowered a second pre-set amount in response to determining occurrence of a condition separate from the temperature reaching the predetermined threshold.

15. The vehicle interface system of claim 1, wherein lowering the windows the pre-set amount occurs after a predetermined time period.

* * * * *